United States Patent
Rich

[15] 3,669,468
[45] June 13, 1972

[54] WHEELED TOY

[72] Inventor: Everett W. Rich, 424 West Pardee Lane, Stockton, Calif. 95207

[22] Filed: Jan. 30, 1970

[21] Appl. No.: 7,096

[52] U.S. Cl. ............................................. 280/267, 280/282
[51] Int. Cl. ......................................... B62k 9/00, B62k 21/00
[58] Field of Search ........................... 280/267, 268, 269, 282

[56] References Cited

UNITED STATES PATENTS

| | | | |
|---|---|---|---|
| 87,713 | 3/1869 | Serrell | 280/267 X |
| 102,322 | 4/1870 | Rhodes et al. | 280/267 X |
| 3,062,559 | 11/1962 | Hewitt | 280/282 X |
| 3,311,388 | 3/1967 | Ryan et al. | 280/269 |
| 1,550,133 | 8/1925 | Whitehall | 280/267 |
| 1,031,280 | 7/1912 | McCarty | 280/267 |
| 397,015 | 1/1889 | McCoy | 280/268 |

Primary Examiner—Benjamin Hersh
Assistant Examiner—John P. Silverstrim
Attorney—Clarence A. O'Brien and Harvey B. Jacobson

[57] ABSTRACT

A three-wheeled vehicle including an occupant supporting body having front and rear ends with a center front wheel journaled from the front end of the body for rotation about a fixed horizontal transverse axis and having foot pedals operatively associated therewith for driving the front wheel. A pair of opposite side rear wheels are journaled from opposite ends of a horizontal rear transverse axle assembly and the axle assembly is oscillatably supported from the rear of the body for angular displacement about a rearwardly and upwardly inclined axis. Further, the body includes a seat structure for the occupant of the vehicle and controls for oscillating the rear axle assembly are supported from the body for actuation by an occupant seated on the seat structure.

3 Claims, 3 Drawing Figures

PATENTED JUN 13 1972  3,669,468

Everett W. Rich
INVENTOR.

BY Clarence A. O'Brien
and Harvey B. Jackson
Attorneys

WHEELED TOY

The vehicle of the instant invention is designed for use by small children although it is to be understood that the vehicle could be constructed on a larger scale and used by adults. Further, the body structure utilized in the embodiment of the vehicle illustrated and described hereinafter may be modified in structure and design without departing from the spirit of the invention.

The main object of this invention is to provide a novel three-wheeled vehicle to be manually propelled in the manner in which a conventional tricycle is propelled, that is by pedals attached to a single forward drive wheel.

Another object of this invention, in accordance with the immediately preceding object, is to provide a three-wheeled vehicle constructed in a manner whereby the body portion of the vehicle will lean to the inside of turns being negotiated by the vehicle whereby the weight of the occupant or user of the vehicle will not have as great a tendency to be shifted to the outside of the vehicle while the same is negotiating a turn.

Another important object of this invention is to provide a vehicle in accordance with the preceding objects and including a body portion provided with a seat structure disposed at an elevation lower than the seat structure of a conventional tricycle of the same size.

A further object of this invention is to provide a novel three-wheeled vehicle which may be readily constructed by the utilization of certain components of conventional tricycles which may be available.

A final object of this invention to be specifically enumerated herein is to provide a three-wheeled vehicle in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
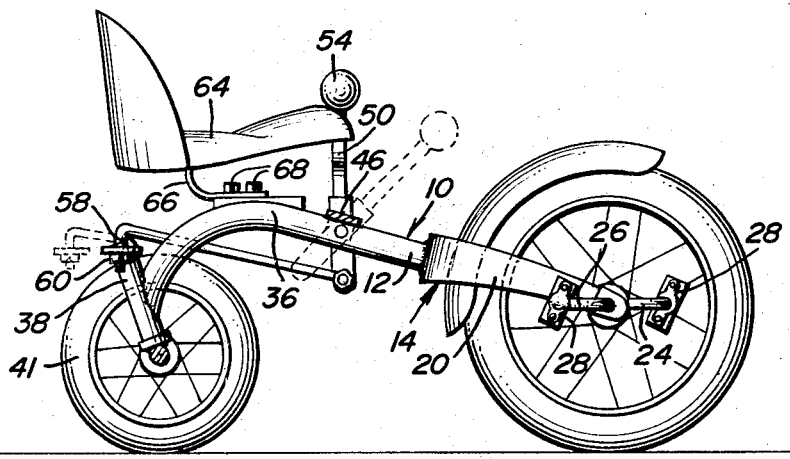
FIG. 1 is a side elevational view of the three-wheeled vehicle of the instant invention.

Referring now more specifically to the drawings, the numeral 10 generally designates the wheeled toy or three-wheeled vehicle of the instant invention. The vehicle 10 includes an elongated generally horizontally disposed body 12 having front and rear ends and a generally horizontally disposed bifurcated front fork assembly referred to in general by the reference numeral 14 has its bight portion 16 secured to the forward end of the body 12 and its spaced arms 18 and 20 projecting forwardly and slightly downwardly from the forward end of the body 12.

A conventional crank axle assembly referred to in general by the reference numeral 22 is journaled between the forward free ends of the arms 18 and 20 and includes a pair of crank arms 24 and 26 on whose free ends a pair of pedals 28 and 30 are journaled. In addition, the front fork assembly 14 includes a fender 32 supported therefrom embracing the upper rear quarter peripheral portion of the front wheel 34 which is mounted on the crank axle assembly 22 between the arms 18 and 20 for rotation therewith.

The body 12 comprises a tubular member and is inclined forwardly and upwardly from its rear end to a point designated by the reference numeral 34. At the point 36 the tubular body 12 curves smoothly rearwardly and downwardly and has a rearwardly and upwardly included tubular sleeve 38 secured thereto.

The vehicle 10 includes a rear horizontal transverse axle assembly referred to in general by the reference numeral 40 including a pair of wheels 41 journalled on the opposite ends thereof and the axle assembly 40 includes an upstanding pivot pin 42 which is also rearwardly and upwardly inclined. The pivot pin 42 is rotatably journaled through the tubular sleeve 38 and a generally horizontally disposed cross head 44 is secured to the upper end of the pivot pin 42. In addition, a stationary and generally horizontally disposed transverse cross head 46 is secured to the body 12 forwardly of the point 36 and the opposite end portions of the cross head 46 are turned downwardly as at 48 and have a pair of upstanding control levers 50 pivotally secured thereto by means of pivot fasteners 52. The pivot fasteners pass through the control levers 50 intermediate their upper and lower ends and the upper ends of the control levers 50 are provided with hand-grip defining knobs 54.

A pair of connecting rods 56 have front and rear ends and the rear ends of the connecting rods 56 are turned downwardly as at 58 and pivotally secured through the corresponding ends of the cross head 44 by means of suitable fasteners 60. In addition, the forward ends of the connecting rods 56 are turned inwardly and secured through the lower ends of the control levers 50 by means of suitable fasteners 62. Accordingly, it may be seen that the rear axle assembly 40 may be caused to oscillate about its upstanding axis of oscillation by oscillating either one or both of the control levers 50.

The body 12 includes a seat structure 64 which is supported from the body 12 rearward of the point 36 by means of a leaf spring 66 and the leaf spring 66 is secured in adjusted position along the body 12 by means of fasteners 68. The positioning of the seat structure 64 is such that a person seated thereon may engage his feet with the pedals 28 and 30 and utilize his hands to grasp the knobs 54 carried by the upper ends of the control levers 50.

Figure 2:
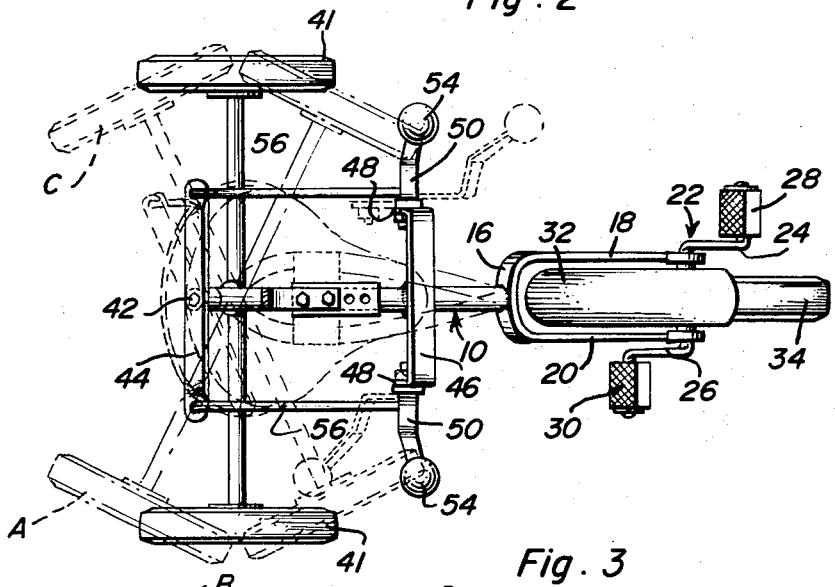
FIG. 2 is a top plan view of the three-wheeled vehicle with the seat structure thereof removed and alternate positions of the rear axle assembly of the three-wheeled vehicle being illustrated in phantom lines.
Figure 3:
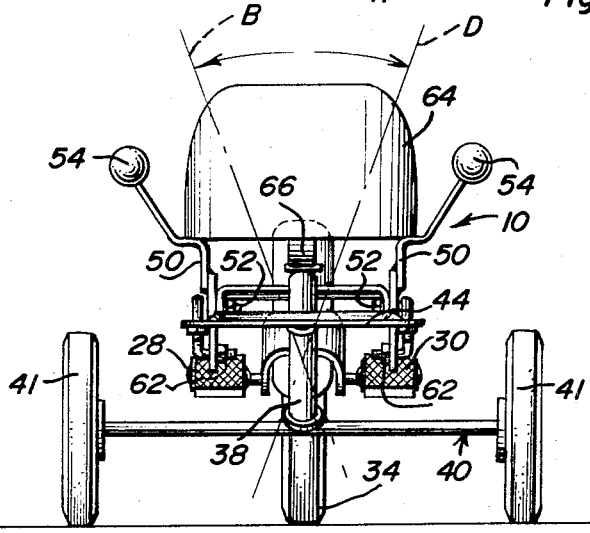
FIG. 3 is a rear elevational view of the three-wheeled vehicle.

Inasmuch as the tubular sleeve 38 and pivot shaft or pin 42 are rearwardly and upwardly inclined, as the rear axle assembly 40 is oscillated to the phantom line position A in FIG. 2 of the drawings the body 12 will be canted so that the normal vertical reference plane of the body 12 will assume the inclined position designated as at B in FIG. 3 of the drawings. On the other hand, when the axle assembly 40 is swung to the phantom line position C in FIG. 2 of the drawings, the body 12 will be canted and disposed in the inclined plane D in FIG. 3 of the drawings. Thus, whenever the vehicle 10 executes a turn, the body 12 will lean to the inside of the turn. Thus, the weight of a person seated on the seat 64 will be prevented from being shifted to the outside of the turn being executed. Further, it will be noted that the vehicle 10 includes a relatively low center of gravity and therefore that the stability of the vehicle 10 when executing turns is even further enhanced.

As hereinbefore set forth, the vehicle 10 is primarily designed for use by children. However, the vehicle 10 may be constructed on a larger scale and utilized by adults and it is even conceivable that the horizontal spacing between the axis of rotation of the front wheel 34 and the rear axle assembly 40 may be appreciably increased so that the body 12 may be provided with a lowered central portion from which the seat 64 may be supported. In this manner, an even lower center of gravity of the vehicle 10 may be achieved.

Inasmuch as the body 12 leans as a turn is executed, the vehicle 10 may be steered merely by the operator causing the body 12 to lean in the direction of the desired turn. Further, the location of the cross head 44 in relation to the downwardly curving rear end portion of the body 12 enables abutting contact of the opposite end portions with the body 12 to limit oscillation of the cross head 44 and thus the axle assembly 40. This, of course, also provides for greater stability and limits the amount the body may be leaned to either side. Finally, the rear tubular sleeve 38 is inclined between 10 and 25° relative to the vertical so as to control the amount of body lean determined by any given angular displacement of the axle assembly 40.

While the vehicle 10 has been illustrated and described as a crank powered vehicle, suitable low power motor means may be provided and drivingly connected to either the rear wheels 41 or the front wheel 34.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wheeled vehicle comprising a rigid body having a forwardly projecting front end, a single front wheel rotatably journalled on the front end of the body for rotation about a transverse axis in fixed relation to the body, foot-operated drive means connected with said front wheel for rotation thereof in a selected direction, said body including a rear end, a forwardly facing occupant seat mounted on said body adjacent the rear end thereof in position for an occupant to manually manipulate the drive means for the front wheel, a rear axle extending transversely of the rear end of the body, a wheel supported from each end of the axle for rotation, means supporting said axle from said body for swinging movement of the axle about an axis extending upwardly and rearwardly with respect to the path of movement of the vehicle in response to the occupant of the seat shifting his weight laterally of the path of movement of the vehicle thereby steering the vehicle, said means supporting said axle from said body including a pivot pin fixed to the center of the axle in substantially perpendicular relation thereto, an upwardly and rearwardly inclined bearing sleeve rigid on said body and journalling said pin therein, the upper end of said pin projecting above the sleeve, a transversely extending cross head on the upper end of said pin, said cross head being parallel to said axle and spaced upwardly and rearwardly in relation thereto, and manually manipulated means connected to each end of the cross head and supported from the body at a position forwardly of the seat to enable an occupant of the seat to manually control swinging movement of the axle about the upwardly and rearwardly inclined axis formed by the sleeve journalling the pivot pin, said body including a rearwardly and downwardly curved rear end, said upwardly and rearwardly inclined sleeve being rigid with the rear lower end of the downwardly curved rear end of the body, said cross head being disposed adjacent the upper end of the sleeve and swingable in a plane intersecting a portion of the rear end of the body whereby the body will limit swinging movement of the cross head and axle.

2. The structure as defined in claim 1 wherein the forwardly extending front end of the body includes a rigid bifurcated front fork assembly, said front wheel being journalled in the fork assembly, said drive means including crank arm supported pedals rotatable with the drive wheel, the rotational axis of the drive wheel being fixed with respect to the fork assembly, body and occupant seat.

3. The structure as defined in claim 2 wherein said means connected to the ends of the cross head include a pair of pivotal levers supported from the body at the front of the occupant seat, and rods connecting the respective levers with the corresponding ends of the cross head whereby the levers may be employed to control the steering movement of the vehicle and also serve to stabilize the person occupying the seat, said forwardly extending fork assembly being oriented with substantially one-half of the front wheel disposed above the fork assembly.

* * * * *